United States Patent
Constantine et al.

(10) Patent No.: US 9,408,108 B2
(45) Date of Patent: *Aug. 2, 2016

(54) CONTROL UNIT AND METHOD FOR CONTROLLING THE LOAD IN A MOBILE TELECOMMUNICATIONS NETWORK

(71) Applicant: Telefonaktiebolaget L M Ericsson (publ), Stockholm (SE)

(72) Inventors: Joe Constantine, Johanneshov (SE); Patrik Karlsson, Älta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,721

(22) Filed: Apr. 8, 2014

(65) Prior Publication Data

US 2014/0219102 A1  Aug. 7, 2014

Related U.S. Application Data

(62) Division of application No. 11/884,654, filed as application No. PCT/SE2005/000224 on Feb. 18, 2005, now Pat. No. 8,724,592.

(51) Int. Cl.
*H04W 28/02* (2009.01)
*H04W 88/02* (2009.01)
(Continued)

(52) U.S. Cl.
CPC ...... *H04W 28/0252* (2013.01); *H04W 36/0072* (2013.01); *H04W 36/22* (2013.01); *H04W 88/02* (2013.01)

(58) Field of Classification Search
CPC .............. H04W 36/08; H04W 36/165; H04W 35/0005
USPC .............. 370/310, 329, 332; 455/403, 422.1, 455/450, 452.1, 452.2
See application file for complete search history.

(56) References Cited

U.S. PATENT DOCUMENTS

| | | | |
|---|---|---|---|
| 6,611,506 B1 | 8/2003 | Huang et al. | |
| 8,724,592 B2 * | 5/2014 | Constantine et al. | 370/332 |

(Continued)

FOREIGN PATENT DOCUMENTS

| | | |
|---|---|---|
| EP | 1 058 473 A1 | 12/2000 |
| WO | WO 01/17307 A1 | 3/2001 |

(Continued)

OTHER PUBLICATIONS

English translation of Chinese Office Action mailed Jan. 8, 2010 in corresponding Chinese application 200580048424. 4.

(Continued)

*Primary Examiner* — Siming Liu

(57) ABSTRACT

A method and control nodes for controlling load-based handover in a mobile telecommunications network is proposed and at least one logical control node for controlling resources in said cell and at least one logical service node for controlling quality of service, wherein said logical service node comprises terminal instruction means for instructing a mobile terminal communicating with said at least first base station to perform a handover, comprising the steps of—determining, in the CRNC, if the load in the cell exceeds a first threshold,—selecting, in the CRNC, a mobile terminal that should be moved to another carrier if the load in the cell exceeds the first threshold, and—instructing, from the CRNC, the SRNC to instruct the at least one mobile terminal to perform a handover.

13 Claims, 2 Drawing Sheets

(51) Int. Cl.
*H04W 36/22* (2009.01)
*H04W 36/00* (2009.01)

(56) References Cited

U.S. PATENT DOCUMENTS

| | | | |
|---|---|---|---|
| 2003/0207688 A1* | 11/2003 | Nikkelen | 455/439 |
| 2004/0022213 A1 | 2/2004 | Choi et al. | |
| 2004/0121777 A1* | 6/2004 | Schwarz et al. | 455/452.1 |
| 2005/0239460 A1 | 10/2005 | Kroth et al. | |

FOREIGN PATENT DOCUMENTS

| | | |
|---|---|---|
| WO | WO 01/30103 A1 | 4/2001 |
| WO | WO 02/01902 A1 | 1/2002 |
| WO | 03/069938 A1 | 8/2003 |
| WO | WO 03/088695 A1 | 10/2003 |

OTHER PUBLICATIONS

EP Office Action mailed Nov. 8, 2010 in corresponding EP application 05711084.3.
Korean Notice of Preliminary Rejection mailed Jun. 27, 2011 in Korean application 10-2007-7020772.
Korean Notice of Allowance mailed Oct. 31, 2011 in Korean application 10-2007-7020772.
Taiwanese Office Action issued in Application No. 095102867 dated Jan. 19, 2012.
Taiwanese Office Action issued in Application 095102867 dated Oct. 31, 2012.
Taiwanese Notice of Allowance issued in Application Serial No. 095102867 dated Feb. 25, 2013.
EP Office Action mailed Mar. 15, 2013 in EP application 05711084.3.
International Search Report for PCT/SE2005/000224 mailed Sep. 26, 2005.
Written Opinion for PCT/SE2005/000224 mailed Sep. 26, 2005 (6 pages).

* cited by examiner

CONTROL UNIT AND METHOD FOR CONTROLLING THE LOAD IN A MOBILE TELECOMMUNICATIONS NETWORK

This application is a divisional application of U.S. patent application Ser. No. 11/884,654 filed Aug. 20, 2007, which is the US national phase of international application PCT/SE2005/000224 filed Feb. 18, 2005, which designated the U.S., the entire content of which is hereby incorporated by reference.

TECHNICAL FIELD

The technology disclosed herein relates to a control node and a method for use in a telecommunications network.

BACKGROUND

Mobile telecommunications networks are generally divided into cells, each cell comprising a base station for communicating with mobile terminals within the cell.

Therefore, the base stations generally comprise functions for monitoring and controlling the quality of service and the load.

In WCDMA networks, the UTRAN comprises one or more base stations controlled by a radio network controller (RNC). According to the standard, the RNC is logically divided into two nodes: the Controlling RNC (CRNC) and the Serving RNC (SRNC).

The CRNC is concerned with resource control, that is, keeping the use of resources at a low level without compromising the quality. Resources include all hardware resources in the cell, and also, for example, capacity, interference and encoding. The SRNC monitors and controls the quality of service for each radio connection, including power control, Block Error Rate (BLER), Bit Error Rate (BER). It also keeps track of the type of communication going on in each connection, for example, speech, video or data communication. The SRNC comprises functions for instructing a mobile terminal to perform a handover if the performance becomes too poor. The handover can be performed either by switching to another channel in the WCDMA network or by changing to another network, for example, GSM.

If more than one RNC is used, the RNCs also comprise a third logical node, the Drift RNC (DRNC).

The load in each particular cell should be controlled so that it does not become too high.

It is an object of the technology disclosed herein to enable a method and apparatus for controlling the load in a particular cell.

SUMMARY

This object is achieved according to the technology disclosed herein by a logical control node for use in a mobile telecommunications network for controlling at least a first base station serving a first cell, said control node comprising functions for controlling resources in said cell and for communicating with a logical service node arranged for controlling quality of service,
said logical service node comprising context means for initiating actions needed for a handover, and terminal instruction means for instructing a mobile terminal communicating with said at least first base station to perform a handover, said logical control node being characterized in that it comprises
determining means for determining if the load in the cell exceeds a first threshold,
selection means for selecting at least one mobile terminal communicating with the at least first base station, that should be moved to another carrier if the load in the cell exceeds the first threshold, and
control node instruction means for instructing the context means in the logical service node to instruct the at least one mobile terminal to perform a handover to the other carrier.

The object is also achieved by a logical service node for use in a mobile telecommunications network, said service node comprising functions for controlling the quality of service, and for communicating with a logical control node arranged to control at least a first base station serving a first cell, said logical service node further comprising terminal context means for initiating actions needed for a handover, and terminal instruction means for instructing a mobile terminal communicating in the network to perform a handover, said logical service node being characterized in that the terminal context means is arranged to
receive from said control node instruction means, a handover instruction to order said terminal instruction means to instruct the at least one mobile terminal to perform a handover to another carrier,
instruct said terminal instruction means to instruct the at least one mobile terminal to perform a handover, when said handover instruction has been received from the control node instruction means.

The object is also achieved by a method for use in a mobile telecommunications network comprising at least a first base station serving a first cell, and at least one logical control node for controlling resources in said cell and at least one logical service node for controlling quality of service, wherein said logical service node comprises terminal instruction means for instructing a mobile terminal communicating with said at least first base station to perform a handover,
said method being characterized in that it comprises the steps of
determining, in the logical control node, if the load in the cell exceeds a first threshold,
selecting, in the logical control node, at least one mobile terminal communicating with the at least first base station, that should be moved to another carrier if the load in the cell exceeds the first threshold, and
instructing, by the logical control node, said terminal instruction means in the logical service node to instruct the at least one mobile terminal to perform a handover to the other carrier, and
instructing, by said terminal instruction means, the at least one mobile terminal to perform a handover to the other carrier upon receiving said instruction from the control node instruction means.

Thus, the technology disclosed herein enables a handover to be performed in order to move one or more mobile terminals if the load in a particular cell becomes too high. Although the current standard comprises functions for initiating a handover if the service is poor, it does not specify functions for performing a handover based on the load in a cell.

According to the technology disclosed herein, the fact that the load is managed by the CRNC while handover functions are managed by the SRNC is overcome by letting the CRNC instruct the SRNC to initiate a handover when the CRNC determines that the load is too high. The CRNC also selects the terminals that are to be instructed to perform a handover. This ensures that the terminals that are selected are the ones that should actually be moved, involving a minimum of signalling between the SRNC and the CRNC.

Said control node instruction means may be arranged to instruct said context means by means of an RNSAP message over a Iur interface. In this case, the terminal context means is arranged to receive the handover instruction from the control node instruction means as an RNSAP message over an Iur interface.

This enables communication between a CRNC and an SRNC belonging to different RNCs, which is needed when a mobile terminal initiates communication while in one cell then moves to another cell that is controlled by another RNC.

In a preferred embodiment said at least one mobile terminal communicates with the at least first base station on a first frequency and said other carrier is a communication channel in the same network using a second frequency which is different from the first frequency.

The other carrier may alternatively be a communication channel in a different mobile telecommunications network.

In a preferred embodiment, for use in a WCDMA network, the logical service node comprises service indicator means for providing at least one service indicator for said at least one mobile terminal to said selection means in the logical control node. The selection means is arranged to receive at least one service indicator for said at least one mobile terminal from said service node and to base its selection on said service indicator.

The service indicator is reported by the exchange in the terrestrial network (MSC or SGSN) to the SRNC when a connection is established. Thus, for the CRNC to perform a selection in this case, the service indicator must be reported from the SRNC to the CRNC. In a preferred embodiment, the service indicator is reported from the SRNC to the CRNC at the establishment of each connection and stored in the CRNC. Alternatively, all service indicators can be reported from the SRNC to the CRNC at certain times, or the CRNC can request the service indicators from the SRNC. The important thing is that the service indicator is available to the CRNC when needed to make a decision about handover.

Preferably, the logical service node further comprises handover selection means for selecting the type of handover to be performed.

Preferably, the selection means is arranged to base its selection on the type of service between the at least one base station and the at least one mobile terminal.

The terminals that are to perform a handover may be selected on the basis of the type of communication going on between each terminal and the respective base station (speech, CS, multi or packet data). For example it will be suitable to select terminals involved in speech communication for handover to GSM since such communication will not suffer from this.

The terminals can also be selected on the basis of the service indicator. This is necessary if a handover to another network is to be performed. At present four service indicators are used:

Should: the terminal should always be handed over to another network if possible Should not: the terminal may be handed over to another network if the quality of service is poor Shall not: the terminal may never by handed over to another network Missing: no service indicator stated.

According to a preferred embodiment, mobile terminals having service indicator "should" or "missing" may be selected for handover if the load is too high. The step of selecting at least one mobile terminal may be based on the traffic class, for example, conversational, streaming, interactive or background, between the at least one base station and the at least one mobile terminal.

Alternatively, or in addition to this, the selection of at least one mobile terminal may be based on the rate and/or the use of resources in the connection between the at least one base station and the at least one mobile terminal The technology disclosed herein also relates to a radio control node for use in a CDMA-based telecommunications network, characterized in that it comprises at least one logical control node as defined above. It may also comprise at least one logical service node as defined above, arranged to communicate with the logical control node.

BRIEF DESCRIPTION OF THE DRAWINGS

The technology disclosed herein will be described in more detail in the following, with reference to the appended drawings, in which.

DETAILED DESCRIPTION OF EMBODIMENTS

Figure 1:
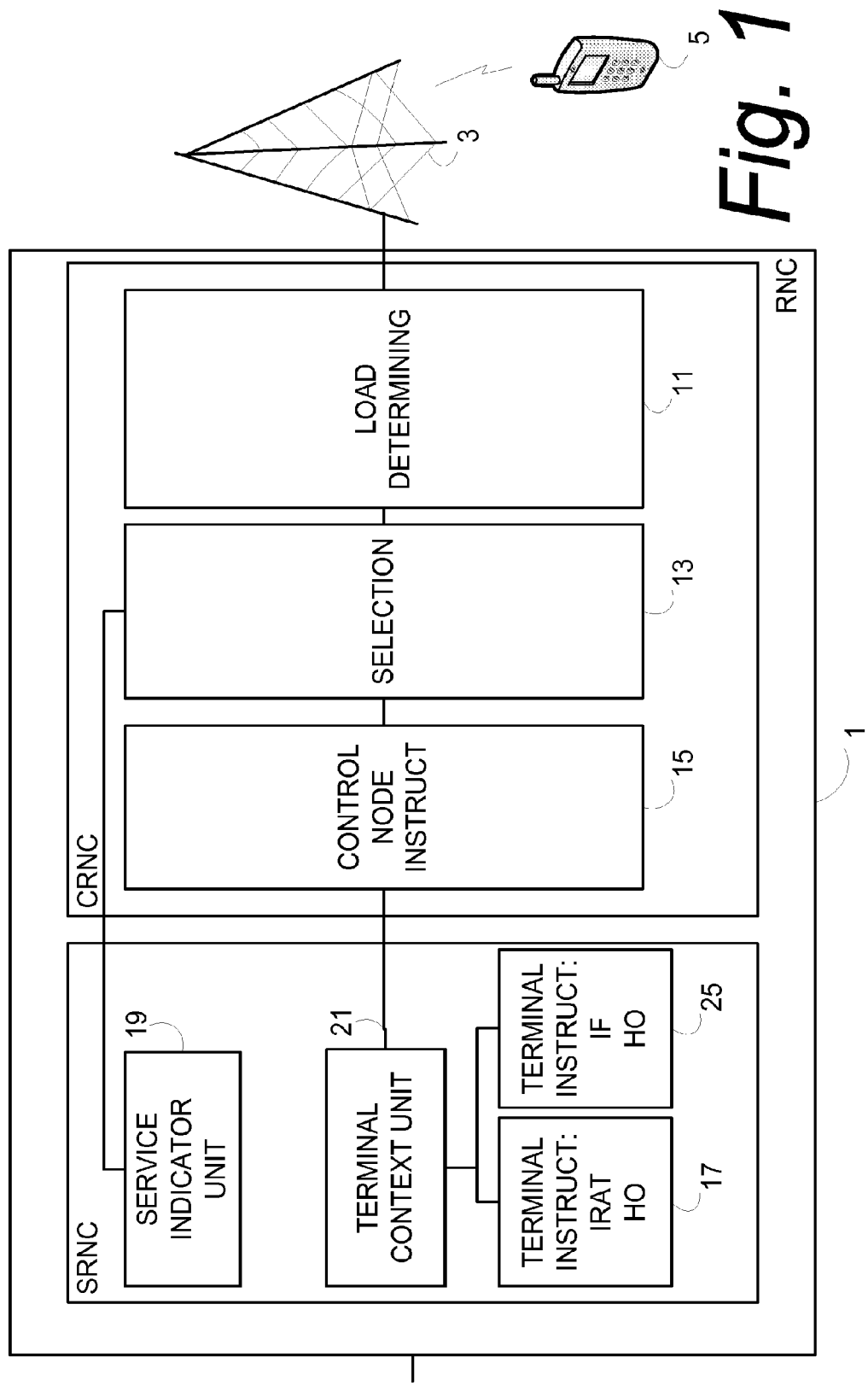
FIG. 1 is an overview of a mobile telecommunications network comprising one radio network controller controlling a number of base stations

FIG. 1 is an overview of a mobile telecommunications network comprising one radio network controller (RNC) 1 controlling a number of base stations 3, each capable of communicating, in at least one cell, with a number of mobile terminals 5. As is common in the art, the RNC 1 comprises two logical nodes, a Control RNC (CRNC) 7 and a Service RNC (SRNC) 9. The CRNC 7 is responsible for controlling the load in each of the cells covered by the base stations 3. The CRNC comprises load determining means 11 for determining the load of each cell. If the load of a particular cell exceeds a first threshold, one or more mobile terminals 3 communicating in this cell should be moved, if possible. The CRNC 7 therefore comprises selection means 13 for selecting the mobile terminal or terminals communicating with the at least first base station, that should be moved to another carrier if the load in the cell exceeds the first threshold. The CRNC 7 also comprises control node instruction means 15 for instructing the SRNC 9 to instruct the at least one mobile terminal to perform a handover. The SRNC comprises terminal instruction means 17, 25 arranged to instruct the mobile terminal or terminals to perform a handover. The CRNC and the SRNC are usually, but not necessarily, implemented in the same physical unit called a Radio Network Controller.

In the embodiment shown in FIG. 1, the mobile telecommunications network is a WCDMA network. Handover may be performed to another network, or to another frequency in the WCDMA network. In the discussion below it is assumed that the handover should be to another network, such as a GSM network. According to the WCDMA standard, each terminal engaged in communication has a service indicator, also called a service handover, assigned to it. The service indicator is communicated from an exchange (MSC or SGSN) to a service indicator unit 19 in the SRNC 9. According to this embodiment of the technology disclosed herein, the service indicator unit 19 is arranged to make the service indicator for each connection available to the selection means 13 of the CRNC 7 and the selection means 13 is arranged to base the selection of terminals that are to be moved on the service indicators. The different service indicators, how they should be reported to the selection means 13 and how they may be used in determining which terminals to move, are discussed above.

When the selection means 13 has selected the terminal or terminals that are to be instructed to perform a handover to reduce the load in the current cell, it informs the control node instruction means 15 in the CRNC, which instructs a terminal context unit 21 in the SRNC 9 to activate the actions needed for initiating a handover. As, in this case, the handover is to be made from one network (that is, WCDMA) to a different network (that is, GSM), this involves sending an Inter-radio Access Technology (IRAT) action from the control node instruction means 15 to the terminal context unit 21 for initiating an IRAT HO. The terminal context unit 21, in turn, would instruct an IRAT HO unit 17 to instruct the selected terminal or terminals to perform a handover to the GSM network.

Alternatively, the handover could be made to another cell within the same network, in which the load was not so high. In this case, an inter-frequency handover would be carried out. The terminal context unit 21 would then instruct an IF HO unit 25 to instruct the selected terminal or terminals to perform a handover to a selected frequency. Since inter-frequency handover can be performed regardless of the service indicator, the communication between the service indicator unit 19 and the selection unit 13 shown in FIG. 1 is not needed in this case.

The type of handover to be performed, that is, interfrequency or to another network, is usually decided by the terminal context means 21 in the SRNC 9. It would also be possible to make the decision in the CRNC and include this information in the message from the CRNC to the terminal context means 21. Alternatively, the CRNC can inform the terminal context means 21 of the preferred type of handover but leave the final decision to the terminal context means.

The terminals that are to perform a handover may also be selected on the basis of the type of communication going on between each terminal and the respective base station (speech, CS, multi or packet data). For example it will be suitable to select terminals involved in speech communication for handover to GSM since such communication will not suffer from this. Other parameters that may be used in the decision include the communication rate and the use of resources. The type of communication and/or other parameters can be used in combination with the service indicator.

When a handover has been requested from the control node instruction means 15, the terminal context means 21 preferably responds to the control node instruction means 15 to inform it whether or not the handover was performed successfully. The response may be in the form of an acknowledgement when handover was successful and/or a negative acknowledgement when handover was not successful. It may be feasible to let the negative acknowledgement indicate if the handover was not completed because terminal instruction means decided that it should not be carried out, or if it failed for some other reason.

Figure 2:
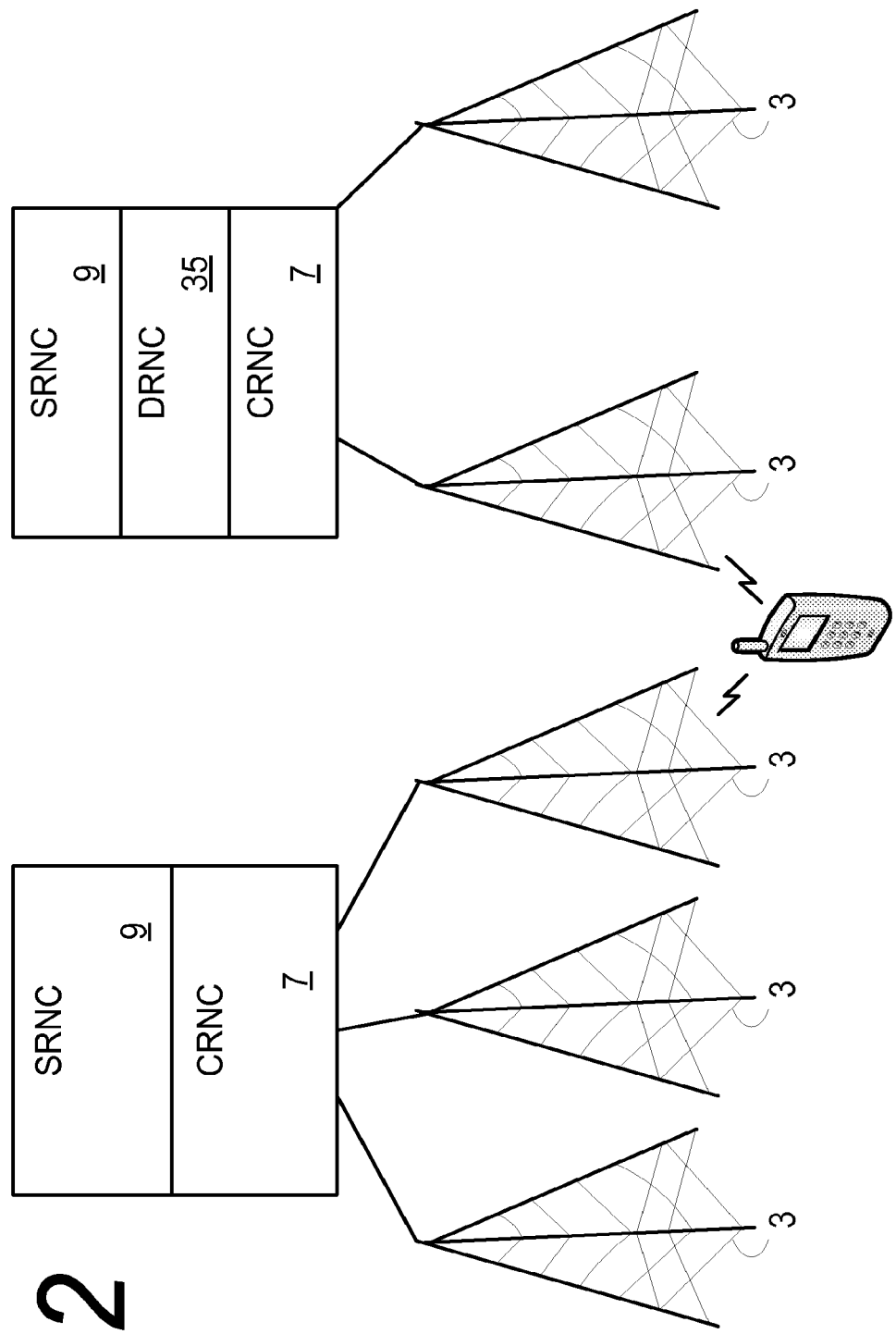
FIG. 2 is an overview of a mobile telecommunications network comprising more than one radio network controller, each controlling a number of base stations.

FIG. 2 is an overview of a mobile telecommunications network comprising a first and a second radio network controller (RNC) 31, 33, each controlling a number of base stations 3. Each base station 3 serves at least one cell, communicating with mobile terminals in the cell. As before, each RNC 31, 33 comprises a logical control node 7 and a logical service node, 9 similar to the logical control node and the logical service node of the RNC 1 of FIG. 1. To enable communication between the different RNCs 31, 33 the second RNC 33 comprises a logical node called the Drift RNC (DRNC) 35. The skilled person is familiar with the communication between RNCs. FIG. 2 illustrates a situation when a mobile terminal has started to communicate with a base station 3 controlled by a first RNC 31 and has later performed a handover to another base station 3 controlled by a second RNC 33. In this case, the logical service node 9 of the first RNC 31 is still responsible for the quality of service of the communication. The load management is, for practical reasons, performed by the logical control node 7 of the second RNC 33. Thus, the two RNCs 31, 33 are both involved in monitoring and controlling the connection. The CRNC 7 of the second RNC 33 communicates with the logical service node 9 of the first RNC 31 through the DRNC 35 of the second RNC 33. The logical control node 7 of the first RNC 31 and the logical service node 9 of the second RNC 33 are not involved in this example. The SRNC 9 of the second RNC 33 is not needed in this example.

The logical control node 7 of the second RNC 33 and the logical service node 9 of the first RNC 31 can be implemented in essentially the same way as shown in FIG. 1, the only difference being that the communication passes through the DRNC 35 of the second RNC 33. Thus, the service indicator unit 19 of the first RNC 31 is arranged to make the service indicator for each connection available to the selection means 13 of the control means 7 of the second RNC 33 through the DRNC 35. Similarly, the control node instruction means 15 in the CRNC 7 instructs the terminal context unit 21 in the SRNC 9, through the DRNC 35 of the second RNC 33, to activate the actions needed for initiating a handover.

Between the RNC nodes 31, 33 there is an interface Iur, which is defined in the WCDMA standard and is therefore well known to the skilled person. As the skilled person is aware, the Iur interface is adapted to a protocol called the Radio Network Subsystem Application Protocol (RNSAP). The new messages needed according to the technology disclosed herein can easily be implemented in this protocol. For internal communication between an SRNC and a CRNC in the same RNC no standard has been specified.

What is claimed is:

1. A logical control node for use in a mobile telecommunications network for controlling at least a first base station serving a first cell, said logical control node comprising:
   a processor; and
   a memory, said memory containing instructions executable by said processor, whereby said logical control node is operative to:
      determine if a load in the first cell exceeds a first threshold,
      select at least one mobile terminal communicating with the at least first base station which should be moved to another carrier if the load in the first cell exceeds the first threshold, the selection based on a traffic class between the at least first base station and the at least one mobile terminal in combination with a service indicator received over an Iur interface from a logical service node; and
      instruct, over the Iur interface, the logical service node to instruct the at least one mobile terminal to perform a handover to the another carrier;
      wherein the traffic class comprises one of:
         conversational traffic;
         streaming traffic;
         interactive traffic; or
         background traffic.

2. The control node according to claim 1, wherein said control node is arranged to instruct said logical service node by a Radio Network Subsystem Application Protocol (RNSAP) message over the Iur interface.

3. The control node according to claim 1, for use in a Wideband Code Division Multiple Access (WCDMA) network, wherein said at least one mobile terminal communicates with the at least first base station on a first frequency and said another carrier is a communication channel in the same network using a second frequency which is different from the first frequency.

4. The control node according to claim 1, wherein said another carrier is a communication channel in a different mobile telecommunications network.

5. The control node according to claim 1, wherein the control node is further operative to request said at least one service indicator from the service node.

6. A logical service node for use in a mobile telecommunications network, said logical service node comprising:
   a processor; and
   a memory, said memory containing instructions executable by said processor, whereby said logical service node is operative to:
      provide at least one service indicator over an Iur interface to a logical control node to enable the logical control node to make a selection of at least one mobile terminal based on a traffic class between at least one base station serving a first cell and the at least one mobile terminal in combination with said service indicator, the selection concerning which mobile terminal should be moved to another carrier if a load in the first cell exceeds a first threshold;
      receive over the Iur interface, from said control node, a handover instruction which is based on the selection and which orders said logical service node to instruct the at least one mobile terminal to perform a handover to another carrier, and
      instruct the at least one mobile terminal to perform the handover, when said handover instruction has been received from the control node;
   wherein the traffic class comprises one of:
      conversational traffic;
      streaming traffic;
      interactive traffic; or
      background traffic.

7. The logical service node according to claim 6, wherein the handover instruction is received from the logical control node as a Radio Network Subsystem Application Protocol (RNSAP) message over the Iur interface.

8. The logical service node according to claim 6, for use in a Wideband Code Division Multiple Access (WCDMA) network, wherein said at least one mobile terminal communicates with the at least first base station on a first frequency and said another carrier is a communication channel in the same mobile telecommunications network using a second frequency which is different from the first frequency.

9. The logical service node according to claim 6, wherein said another carrier is a communication channel in a different mobile telecommunications network.

10. The logical service node according to claim 6, wherein said at least one service indicator is provided on request from the logical control node.

11. The logical service node according to claim 6, wherein said at least one service indicator is provided at the start of a connection.

12. The logical service node according to claim 6, wherein said at least one service indicator is provided at certain times.

13. The logical service node according to claim 6, further operative to select the type of handover to be performed.

* * * * *